United States Patent
Berkemeier et al.

(10) Patent No.: US 10,494,789 B2
(45) Date of Patent: Dec. 3, 2019

(54) SYSTEM AND METHOD FOR AUTONOMOUS STEERING CONTROL OF WORK VEHICLES

(71) Applicants: CNH Industrial America LLC, New Holland, PA (US); Autonomous Solutions, Inc., Mendon, UT (US)

(72) Inventors: Matthew D. Berkemeier, Logan, UT (US); Jeffrey Lee Ferrin, Hyde Park, UT (US); John Arthur Mitsuru Petersen, Providence, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 85 days.

(21) Appl. No.: 15/400,518

(22) Filed: Jan. 6, 2017

(65) Prior Publication Data
US 2017/0191244 A1    Jul. 6, 2017

Related U.S. Application Data

(60) Provisional application No. 62/275,618, filed on Jan. 6, 2016.

(51) Int. Cl.
*E02F 9/20* (2006.01)
*B62D 11/00* (2006.01)
*E02F 3/34* (2006.01)
*E02F 9/22* (2006.01)

(52) U.S. Cl.
CPC .......... *E02F 9/2045* (2013.01); *B62D 11/003* (2013.01); *E02F 3/3414* (2013.01); *E02F 9/205* (2013.01); *E02F 9/2037* (2013.01); *E02F 9/225* (2013.01); *B60Y 2200/25* (2013.01)

(58) Field of Classification Search
CPC ...... E02F 3/3414; E02F 9/2045; E02F 9/2246
See application file for complete search history.

(56) References Cited

U.S. PATENT DOCUMENTS

| | | | |
|---|---|---|---|
| 5,287,280 A * | 2/1994 | Yamamoto | B60K 28/16 180/197 |
| 7,630,807 B2 | 12/2009 | Yoshimura et al. | |
| 7,654,348 B2 | 2/2010 | Ohm et al. | |
| 8,090,493 B2 | 1/2012 | Aso | |
| 8,140,228 B2 | 3/2012 | McCabe et al. | |
| 8,565,977 B2 | 10/2013 | Gupta et al. | |
| 8,612,084 B2 | 12/2013 | Hennessy et al. | |
| 2010/0204891 A1 | 8/2010 | Biggerstaff | |
| 2012/0185091 A1 | 7/2012 | Field et al. | |

FOREIGN PATENT DOCUMENTS

JP     01266077 A     10/1989

* cited by examiner

*Primary Examiner* — Anshul Sood
(74) *Attorney, Agent, or Firm* — Rebecca L. Henkel; Rickard K. DeMille

(57) ABSTRACT

An electronic control system for a work allows for control of steering despite movement of an implement that may support a load. Control may be based on vehicle position, velocity, acceleration, center of gravity, and heading. A control point is determined despite movement of the load, and may be based upon one or more of roll, yaw, and pitch of the vehicle. The vehicle may be of the type that allows for control only of wheel or track speed and rotational direction. A desired center of gravity is maintained while controlling an error between a desired vehicle trajectory and a determined trajectory in a closed loop manner.

10 Claims, 4 Drawing Sheets and controls the speed and rotational direction of the wheels or tracks to maintain a computed a trajectory of the vehicle based in part on a control point.

The present disclosure also relates to a method for controlling a work vehicle comprising translating a moveable implement coupled to the work vehicle relative to the vehicle, receiving an operator steering input, and receiving sensor data indicative of one or more of vehicle position, vehicle velocity, vehicle acceleration, and vehicle heading. Based upon at least the load, a center of gravity, and the sensor data, a control point is determined. Driving of vehicle wheels or tracks is then controlled by determining the center of gravity of the vehicle, wherein the control circuitry regulates driving of the wheels or tracks to maintain a desired trajectory.

SYSTEM AND METHOD FOR AUTONOMOUS STEERING CONTROL OF WORK VEHICLES

CROSS REFERENCE TO RELATED APPLICATIONS

This application claims priority from and the benefit of U.S. Provisional Patent Application No. 62/275,618, entitled "SYSTEM AND METHOD FOR AUTONOMOUS STEERING CONTROL OF WORK VEHICLES," filed Jan. 6, 2016, which is hereby incorporated by reference in its entirety.

BACKGROUND

The invention relates generally to a system and method for autonomous control of work vehicles, particularly skid steer and similar vehicles.

Work vehicles, such as a skid steer loader, are increasingly being used on job sites. Skid steer loaders are typically used as general utility machines, due to their versatility and ability to operate on job sites having reduced amounts of surface area. Their short footprint and highly flexible steering are particularly attractive in such applications.

Despite their versatility, skid steer loaders may be configured differently to control attached implements, such as a blade or bucket, with which some work is performed. That is, the controls may perform different functions with respect to the implement, such as raising the arms of a blade or bucket, or rotating the implement about a rotational axis. These differences in different control implements and functions result in different centers of gravity based on the control implement attached. These variables may make it difficult to determine the vehicle behavior and control the vehicle.

Accordingly, to allow for better and more predictable control, it would be advantageous to determine the center of gravity of such vehicles and to regulate at least some operations (e.g., steering) based on the center of gravity.

BRIEF DESCRIPTION

The present disclosure relates to a work vehicle that includes a movable implement capable of translation relative to the vehicle in response to operator inputs to move a load. A plurality of driven wheels or tracks are controllable in rotational speed and direction for steering the vehicle. A plurality of sensors includes at least sensors for providing data indicative of vehicle position, velocity, acceleration, and heading. Control circuitry, in operation, receives the operator inputs and the sensor data, and controls driving of the wheels or tracks by determining a load on the implement, determining a control point of the vehicle, wherein the control circuitry regulates driving of the wheels or tracks to maintain a desired trajectory.

The present disclosure further relates to a work vehicle comprising a movable implement capable of translation relative to the vehicle in response to operator inputs to move a load, a plurality of driven wheels or tracks independently controllable only in speed and rotational direction for steering the vehicle, and a plurality of sensors, including at least sensors for providing data indicative of vehicle position, velocity, acceleration, and heading. Control circuitry, in operation, receives the operator inputs and the sensor data, and controls the speed and rotational direction of the wheels

DRAWINGS

These and other features, aspects, and advantages of the present techniques will become better understood when the following detailed description is read with reference to the accompanying drawings in which like characters represent like parts throughout the drawings, wherein.

DETAILED DESCRIPTION

A system and method for automatically controlling the steering of a work vehicle and accounting for changes when the center of gravity of the work vehicle changes (e.g., as product is loaded and/or unloaded from the work vehicle) is described herein. The system and method for controlling the steering of the work vehicle include adjusting the trajectory of the work vehicle by using equations to predict the effects of several variables (e.g., x position, y position, heading angle, bias in rate gyro, right wheel speed, left wheel speed). The system and method include maintaining control of the vehicle based in part on a control point (e.g., a predetermined point on the work vehicle used to calculate a deviation of the vehicle from the desired point). The system and method for controlling the steering of the work vehicle also include taking various measurements to predict the vehicle trajectory, and to measure the actual trajectory. The error between the measured trajectory and the predicted trajectory is minimized by adjusting the steering of the wheels (e.g., right side wheels, left side wheels). In an illustrative embodiment, the system and method may include one or more controllers configured to translate a moveable arm the vehicle. The controller is configured to receive data indicative, for example, of a first position, a first acceleration, a first angular velocity, a first heading angle, and a first velocity. The controller then automatically controls the vehicle by determining a load, by identifying a center of gravity based in part on the load and the received data, and the control point. In particular, the controller may control wheels to adjust trajectory to maintain the trajectory of the work vehicle on the desired path.

Figure 1:
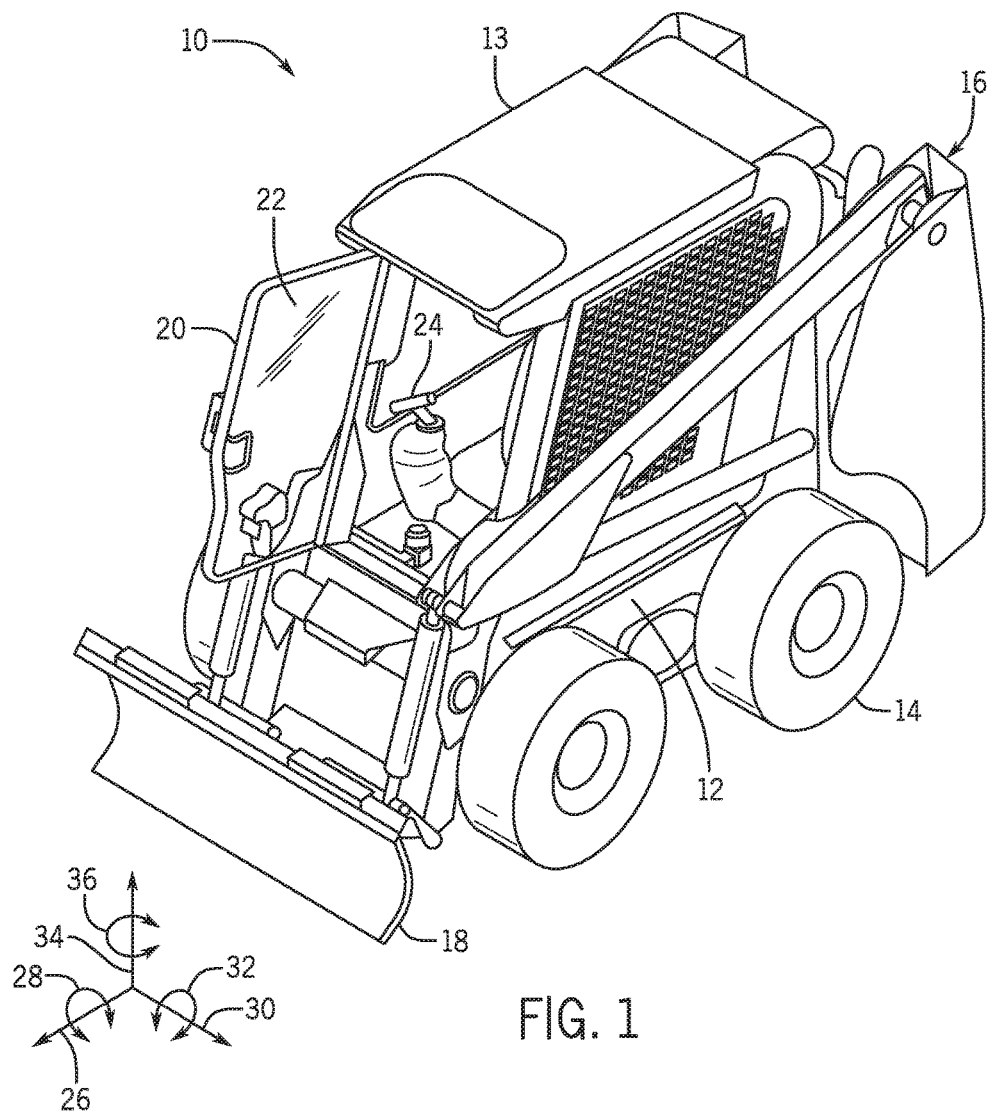
FIG. 1 is a top perspective view of an embodiment of an exemplary work vehicle that implements aspects of the techniques disclosed herein.

Turning now to the drawings, FIG. 1 shows a work vehicle 10 having a frame 12 that is supported and moved by a plurality of wheels 14. Alternately, a track drive or other appropriate drive system may be used. A manipulating structure 16 includes an arrangement of structural members and actuators controllable by an operator (not shown), such as by an operator control 24 (e.g., a joystick or lever), to manipulate an implement 18 to perform work. As further shown in FIG. 1, the operator control 24 for controlling the work vehicle may be located within a cab 13. Frame 12 structurally supports the cab 13 to at least partially surround the operator. A door 20 may provide operator ingress/egress to work vehicle 10, including a window or opening 22 through which an operator may view a work environment exterior of the work vehicle.

It is to be understood that the term "manipulating structure" as generally used here not only refers to the input device or devices (e.g., one or more joysticks, levers, etc.), but may also include various components, such as pumps, hoses, valving, fittings, hydraulic cylinders, hardware, and so forth to hold and move the implement, such as a bucket or blade, in a desired and controlled manner, both when the vehicle is stopped and when it is moving.

FIG. 1 further shows a plurality of axes and movements associated with respect to those axes as pertains to work vehicle 10. These axes and movements are provided to correspond to associated movements of implement 18 and the vehicle itself. For example, as shown, one axis 26 corresponds to a movement of the work vehicle in a longitudinal or "straight-ahead" direction. A rotational movement 28 of the implement about axis 26, sometimes referred to as "tilt" or roll. FIG. 1 also shows an axis 30 which corresponds to a lateral or side direction with respect to an operator seated inside the cab. For example, axis 30 may correspond to a left and right hand directions of movement or turning that are substantially perpendicular to axis 26. A rotational movement 32 of an implement about axis 30 is sometimes referred to as a "back-angle" or pitch. An axis 34 extends in a substantially vertical direction with respect to an operator seated inside the cab of the vehicle. A rotational movement 36 of the implement about axis 34 is sometimes referred to as "angle" or yaw. All of the rotational movements contribute to changes of the center of gravity, which impact the ability to control the work vehicle 10. In one embodiment, multiple sensors 38 are disposed on the work vehicle 10 to detect such movements. The sensors 38 may include, for example, load cells, speed sensors, accelerometers, wind sensors, vibration sensors, noise or acoustic sensors, force or resistance sensors, load level sensors, load tilt or angle sensors, load weight sensors, location stability sensors (e.g., motion caused by waves), or any combination thereof.

Figure 2:
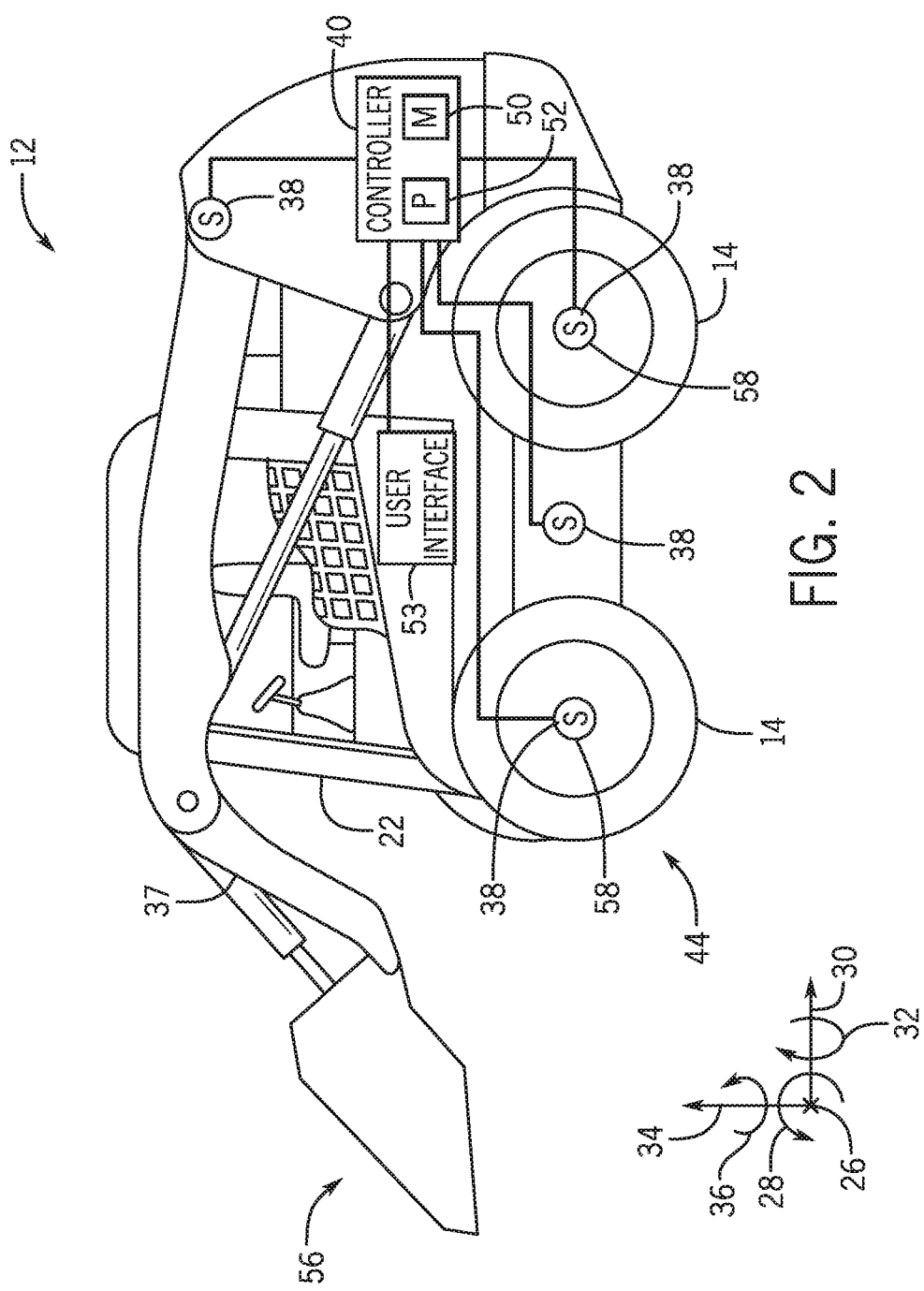
FIG. 2 is a side view of the work vehicle, illustrating certain sensors that may be used to determine data useful in determining and/or maintaining a desired center of gravity.

Data collected by the sensors 38 is used in part to determine one or more parameters useful in controlling the vehicle as it is moved during operation, such as a steering angle of the wheels of the work vehicle 10, its velocity, a load weight carried by the vehicle, slippage of the wheels, and so forth. The sensors may be positioned at various locations on the vehicle, as shown in FIG. 2. One or more controllers 40 may utilize the sensor data to adjust the direction of the wheels 14 based in part on the control point such that the trajectory of the work vehicle 10 is controlled despite different positions and movement of the vehicle and the implement.

FIG. 2 depicts a perspective view of the work vehicle 10, illustrating an embodiment of the position of sensors 38 (e.g., load cells) disposed on the vehicle. Traditional work vehicles (e.g., skid steer vehicles) include right side wheels 42 or tracks and left side wheels 44 or tracks. To steer the vehicle, the wheels 42, 44 are driven at different speeds and/or directions. If the weight distribution between the right side wheels 42 and the left side wheels 44 is identical, both the right side wheels 42 and the left side wheels 44 would have the same skidding trajectory and skidding velocity (assuming for now a straight-line trajectory). In the illustrated embodiment, the weight distribution between the right side wheels 42 and the left side wheels 44 is often uneven, resulting in a changed center of gravity and changed pivot point. In general, according to the present techniques, a pivot point of the work vehicle 10 is dependent on the center of gravity of the work vehicle 10, among other factors. The mass and stability of a load 56 and the position of the implement, the load, and the lever arms supporting the implement also affect the center of gravity.

The navigation of the work vehicle 10 is controlled by the controller 40. It should be noted that while the term "controller" is used in the present discussion, in practice, the "controller" may consist of one or more independent or cooperating units, which itself or themselves comprise processing circuitry, memory circuitry, input and output components, control signal generating and output components, and so forth. For example, the controller 40 may have a processor 52 (e.g., multiple microprocessors, one or more "general-purpose" microprocessors, one or more special-purpose microprocessors, and/or one or more application specific integrated circuits (ASICs), system-on-chip (SoC) device, or some other processor configuration) and memory 50 (e.g., random access memory, read only memory, flash memory, volatile or non-volatile memory, hard drive, etc.). The controller 40 is configured to store instructions (e.g., code) in the memory 50 and to execute the instructions via the processor 52 to control operation of the work vehicle 10. In particular, the controller 40 may execute instructions to control the wheels 42, 44 to provide a stable rate of movement in one or more directions 54 (e.g., linear or rotational movement) based, for example, on a size, weight, shape, or other characteristics of the load 56, the stability of the locations (e.g., pushing through ground or various impediments), and so forth. For example, the controller 40 may communicatively couple to various sensors throughout the work vehicle 10 and use sensor data to improve the movement of the vehicle and load. As described above, the sensors 38 may include load cells, speed sensors, accelerometers, wind sensors, vibration sensors, noise or acoustic sensors, force or resistance sensors, load level sensors, load tilt or angle sensors, load weight sensors, location stability sensors (e.g., motion caused by waves), or any combination thereof. In the illustrated embodiment, the sensors 38 are disposed on the central shaft for the rotating wheels (e.g., axles 58). However, it should be appreciated the sensors 38 may be located along the rotatable arm 37, the frame 12, and so forth. The controller 40 may be communicatively coupled to a user interface 53 or control panel having a display (e.g., LED, LCD, or touch screen display), user inputs (e.g., buttons, keypad or keyboard, touchpad, mouse, etc.), outputs or alerts (e.g., audio or visual alarms), or any combination thereof. These may be integrated into or utilize existing operator controls.

The operator instructions (e.g., load control and steering inputs) and data (e.g., sensor feedback) received by the controller 40 may be utilized to generate state estimates of the work vehicle 10, including but not limited to, the work vehicle position, heading angle, bias in the rate gyro, right wheels and left wheels velocity, steering angle, a pitch angle, a roll angle, a yaw angle of the work vehicle 10, or a combination thereof, as well as rates of change of any one or more of these (e.g., first and/or second derivatives). As used herein, "position" (e.g., determined position, target position, etc.) refers to a position vector, such as a one, two, or three-dimensional position vector. For example, a two-dimensional position vector may include latitude and longitude, and a three-dimensional position vector may include latitude, longitude, and altitude/elevation. As will be appreciated, the position vector may be represented in a rectangular, polar, cylindrical, or spherical coordinate system, among other suitable coordinate systems, and may be determine and manipulated in one or more dimensions. In addition, as used herein, "velocity" (e.g., determined velocity, target velocity, etc.) refers to a velocity vector, such as a one, two, or three-dimensional velocity vector. For example, a one-dimensional velocity vector may include speed and direction in one direction only (e.g., ground speed), a two-dimensional velocity vector may include speed and direction in more than one direction (e.g., ground speed) and heading within a plane (e.g., along a ground plane), and a three-dimensional velocity vector may include speed and heading within three-dimensional space. Similar to the position vector, the velocity vector may be represented in a rectangular, polar, cylindrical, or spherical coordinate system, among other suitable coordinate systems. In certain embodiments, the velocity may be represented as a unit/normalized vector, i.e., a vector having a unit magnitude. In such embodiments, the magnitude (e.g., speed) is not included in the velocity vector. For example, a two-dimensional velocity unit vector may be representative of heading within a plane (e.g., along a ground plane), and a three-dimensional velocity unit vector may be representative of heading within a three-dimensional space. Similarly, in some embodiments, speed alone in one or more directions may be determined and manipulated for one or more aspects of the control described.

The controller 40 may utilize a model to predict the motion of the work vehicle 10 as described below:

$$\mu_t = g(u_t, \mu_{t-1}) = \mu_{t-1} + \Delta t \begin{bmatrix} v_v \cos\theta + d \frac{\Delta v}{w} \sin\theta \\ v_v \sin\theta - d \frac{\Delta v}{w} \cos\theta \\ k_{sf} \frac{\Delta v}{w} \\ 0 \\ 0 \\ 0 \end{bmatrix} \quad (1)$$

where the variables are defined as $\Delta v = v_r - v_l$ $v_v = 0.5(v_r + v_l)$ d=rotationCenterOffset
$k_{sf}$=spinSlipFactor
w=trackwidth
θ is the heading.

Equation (1) provides a new estimate of each state component, based on the previous estimates and based on a time increment of $\Delta t$. Thus, the first component of the equation is the new work vehicle x-axis position, the second component is the new work vehicle y-axis position, and the third component is the new work vehicle heading angle, and so forth. A forward speed of the work vehicle 10, $v_v$ is projected onto the x-axis by multiplying $v_v$ by cos θ, where θ is the heading angle of the work vehicle 10.

In embodiments where the work vehicle 10 rotates off-center, the center point motion is different from simple rotation. The second term in the x component accounts for pivoting at a point that is not at the center of the vehicle. The rotationCenterOffset, d, is the offset along the x-axis of the work vehicle 10 relative to a control point (e.g., the center of the work vehicle 10). For example, as the vehicle turns left about a pivot point, the center point moves. The x and y components are affected by the amount shown in equation (1). As a final step, the result is multiplied by $\Delta t$ to determine the change in position, which is added to the initial velocity to produce the new estimate of the velocity. In the illustrated embodiment, a velocity of the work vehicle 10, $v_v$ is projected onto the y-axis by multiplying $v_v$ by sin θ, where θ is the heading angle of the work vehicle 10 and can be understood in an analogous manner.

The angular velocity $\Delta v/w$ of the work vehicle 10 is multiplied by $\Delta t$ to produce the predicted increment in heading. The angular velocity $\Delta v/w$ is multiplied by a slip factor, $k_{sf}$ to account for wheel slip that the work vehicle 10 may experience. The resulting value is then added to the previous heading estimate to provide the new estimate.

Certain components of the state vector may "drop out" of the calculations. For example, the fourth component provides the "new" estimate for the gyro bias b. In the illustrated equation, the new prediction for the gyro bias b remains unchanged from the previous estimate. Because of this, a Kalman filter may rely purely on measurement updates to estimate the gyro bias b. Similarly, the fifth and sixth components for wheel velocity may remain unchanged. In the illustrated embodiment, the model can also be provided with an input u, which can be seen on the left-hand-side of the equation. However, no input is used in the current implementation.

The controller 40 may utilize another model for measuring the motion of the work vehicle 10 as described below. Measurement of the motion may be described as $z_t = h(\mu_t)$. The motion measurement may take the form:

$$h(\mu_{t-1}) = \begin{bmatrix} x_{gps} \\ y_{gps} \\ \dot{x}_{gps} \\ \dot{y}_{gps} \\ \theta_{imu} \\ v_l \\ v_r \end{bmatrix}_t = \begin{bmatrix} x + q_x\cos\theta - q_y\sin\theta \\ y + q_x\sin\theta + q_y\cos\theta \\ v_x - \omega(q_x\sin\theta + q_y\cos\theta) \\ v_y + \omega(q_x\cos\theta - q_y\sin\theta) \\ \omega + b \\ v_l \\ v_r \end{bmatrix} \quad (2)$$

where, $(q_x, q_y, q_z)$ is the GPS offset from the control point. The GPS offset is defined using a standard Cartesian coordinate frame with the control point at the origin and the x-axis out the front of the vehicle, the y-axis to the left and z-axis up. This offset needs to be rotated into this frame before these equations are valid. The x and y velocities and yaw rate used in the computation are computed using:

$v_x = v_v \cos\theta$ $v_y = v_v \sin\theta$

-continued $$\omega = \frac{\Delta v}{w}.$$

To minimize error between the prediction of the motion of the work vehicle 10 and the measurement of the motion of the work vehicle 10, derivatives of equations 1 and 2 with respect to the state vector may be represented as:

$$G(u, \mu) = \frac{\partial g(u, \mu)}{\partial \mu}, \quad H(\mu) = \frac{\partial h(\mu)}{\partial \mu}.$$

The values of these matrices are:

$$G(u, \mu) = I_6 + \Delta t \begin{bmatrix} 0 & 0 & g_{x\theta} & 0 & g_{xv_l} & g_{xv_r} \\ 0 & 0 & g_{y\theta} & 0 & g_{yv_l} & g_{yv_r} \\ 0 & 0 & 0 & 0 & g_{\theta v_l} & g_{\theta v_r} \\ 0 & 0 & 0 & 0 & 0 & 0 \\ 0 & 0 & 0 & 0 & 0 & 0 \\ 0 & 0 & 0 & 0 & 0 & 0 \end{bmatrix}$$

where $I_6$ is a 6×6 identity matrix and the matrix elements are $$g_{x\theta} = -v_v \sin\theta + d\frac{\Delta v}{w}\cos\theta \quad g_{y\theta} = v_v \cos\theta + d\frac{\Delta v}{w}\sin\theta$$

$$g_{xv_l} = 0.5\cos\theta - \frac{d}{w}\sin\theta \quad g_{yv_l} = 0.5\sin\theta + \frac{d}{w}\cos\theta$$

$$g_{xv_r} = 0.5\cos\theta + \frac{d}{w}\sin\theta \quad g_{yv_r} = 0.5\sin\theta - \frac{d}{w}\cos\theta$$

$$g_{\theta v_l} = -\frac{k_{sf}}{w}$$

$$g_{\theta v_r} = \frac{k_{sf}}{w}$$

and $$H(u, \mu) = \begin{bmatrix} 1 & 0 & h_{x\theta} & 0 & 0 & 0 \\ 0 & 1 & h_{y\theta} & 0 & 0 & 0 \\ 0 & 0 & h_{\dot{x}\theta} & 0 & h_{\dot{x}v_l} & h_{\dot{x}v_r} \\ 0 & 0 & h_{\dot{y}\theta} & 0 & h_{\dot{y}v_l} & h_{\dot{y}v_r} \\ 0 & 0 & 0 & 1 & h_{\theta v_l} & h_{\theta v_r} \\ 0 & 0 & 0 & 0 & 1 & 0 \\ 0 & 0 & 0 & 0 & 0 & 1 \end{bmatrix}$$

where the matrix elements are:

$h_{x\theta} = -q_x \sin\theta + q_y \cos\theta$ $h_{y\theta} = q_x \cos\theta + q_y \sin\theta$ $h_{\dot{x}\theta} = -\dot{y}$ $h_{\dot{x}v_l} = 0.5\cos\theta - (q_x \sin\theta + q_y \cos\theta)/w$ $h_{\dot{x}v_r} = 0.5\cos\theta + (q_x \sin\theta + q_y \cos\theta)/w$ $h_{\dot{y}\theta} = \dot{x}$ $h_{\dot{y}v_l} = 0.5\sin\theta - (q_x \cos\theta - q_y \sin\theta)/w$ $h_{\dot{y}v_r} = 0.5\sin\theta + (q_x \cos\theta - q_y \sin\theta)/w$ $h_{v_l v_r} = -1/w$ $h_{v_r v_l} = 1/w$ The covariance of the state vector is then estimated at a time t, denoted by the matrix P. The noise in the process model at a time t is represented by the covariance matrix $R_t$ and the sensor noise at a time t is represented by the covariance matrix $Q_t$. The discrete extended Kalman filter for this implementation may have the form:

$$\bar{\mu}_t = g(u_t, \mu_{t-1})$$

$$\bar{P}_t = G_t P_{t-1} G_t^T + R_t$$

$$K_t = \bar{P}_t H_t^T (H_t \bar{P}_t H_t^T + Q_t)^{-1},$$

$$\mu_t = \bar{\mu}_t + K_t (z_t - h(\bar{\mu}_t))$$

$$P_t = (I - K_t H_t) \bar{P}_t$$

where $K_t$ is the Kalman gain. The subscripts of t indicate that the values are at time index t, while a bar over a matrix or vector indicates an intermediate quantity. Equation (1) (e.g., prediction equation) can be executed independently of equation (2) (e.g., the measurement equation). The measurement equation is executed when new measurements are available, unless otherwise instructed via the user interface. After the prediction equation and measurement equation are executed, numerous estimates can be obtained by iterating through the estimates. It should be appreciated that, in a typical implementation, the previous estimates will be the input variables for the current state to obtain the new values.

Figure 3:
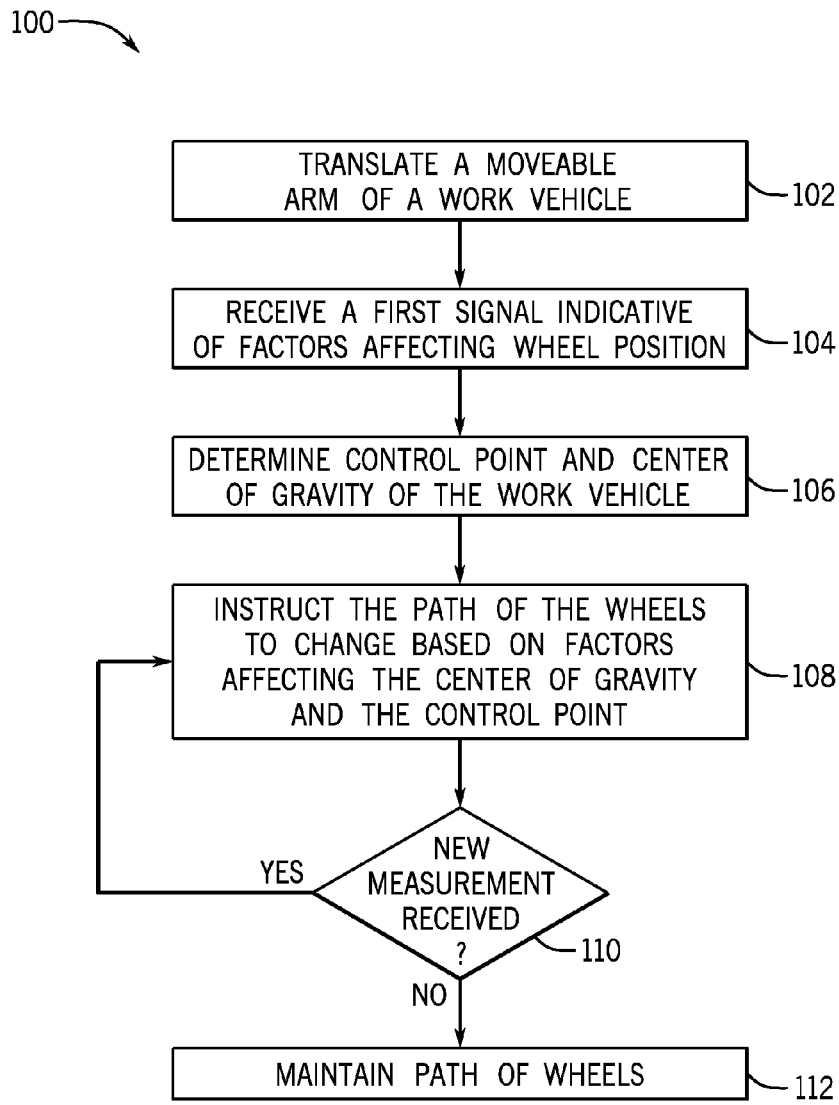
FIG. 3 is a flow diagram of an exemplary embodiment of a method for controlling the work vehicle.

FIG. 3 is a flow diagram of an embodiment of a method 100 for controlling the work vehicle 10. The method 100 includes translating a moveable arm of the work vehicle 10 (e.g., a skid steer vehicle) as needed as the work vehicle 10 is used in operation (block 102). The work vehicle 10 may be used for moving material, raising, lowering, loading and unloading various loads and materials, or any other suitable purposes depending on the attachment. The method 100 includes receiving data or a first signal or signals indicative of the positions of the right side wheels and the left side wheels (block 104). As described above with respect to the discussion of FIG. 2, the first signals may include a first position, a first acceleration, a first angular velocity, a first heading angle, and a first velocity of the work vehicle 10, or any combination thereof. The method 100 includes determining a control point and a center of gravity of the work vehicle 10 from data provided by the plurality of sensors disposed about the work vehicle 10 (block 106). Here again, the sensors may include speed sensors, accelerometers, wind sensors, vibration sensors, noise or acoustic sensors, force or resistance sensors, load level sensors, load tilt or angle sensors, load weight sensors, location stability sensors (e.g., motion caused by waves), or any combination thereof. The method 100 includes instructing the right and the left wheels to account for a new center of gravity (e.g., a deviation from the control point) (block 108) based on a new estimate including factors affecting the trajectory of the right and the left wheels, and of the vehicle in general. The method 100 includes determining whether a new measurement has been received (block 110). If a new measurement has been received, the previous step (block 108) is repeated. If a new measurement has not been received, the parameters affecting the right and the left wheels are maintained (block 112).

Figure 4:
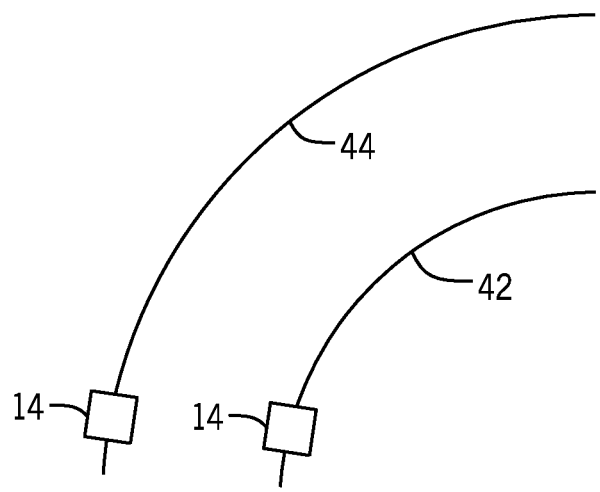
FIG. 4 is a top view of a steering trajectory of the wheels of the work vehicle when the work vehicle travels in a curved trajectory.
Figure 5:
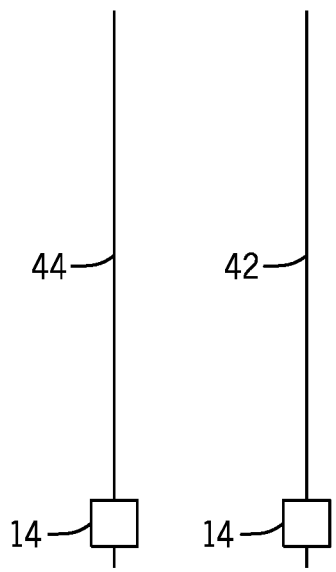
FIG. 5 is a top view of a steering trajectory of the wheels of the work vehicle when the work vehicle travels in a linear trajectory.

FIGS. 4-5 are top views of a trajectory of the vehicle 10 and wheels 14. FIG. 4 is a top view of the pathway of the trajectory of the wheels 14 (e.g., right wheels 42, left wheels 44) of the work vehicle 10 when the work vehicle 10 travels in a curved trajectory. The controller is configured to automatically adjust the trajectory (e.g., speed, direction, steering) of the wheels 14 of the work vehicle 10 based in part on the control point. When following a curve, the controller 40 uses several variables to determine the desired curvature of the trajectory. The variables may include, but are not limited to, a vehicle position (e.g., x, y coordinates on a Cartesian coordinate frame), radius of the arc of the work vehicle path, and heading angle of the work vehicle 10. An error in trajectory tracking and a time derivative associated with the error can be calculated. The controller uses these variables, such as to calculate a desired curvature to direct the work vehicle towards the desired steering trajectory. FIG. 5 is a top view of the pathway of the trajectory of the wheels 14 of the work vehicle when the work vehicle 10 travels in a linear trajectory. The same variables described with respect to the discussion for FIG. 4 may be used to adjust the trajectory of the work vehicle if a linear trajectory is desired. An error in trajectory tracking and a time derivative associated with the error can be calculated. As the work vehicle 10 proceeds along its desired trajectory, the controller adjusts automatically the speed, direction and/or steering angle of the wheels 14 in order to move the work vehicle along the requested (e.g., curved, linear) pathway based in part on the control point. In a presently contemplated embodiment, the controller calculates proportional gains and derivative gains and automatically adjusts the trajectory of the work vehicle to keep the error values within an acceptable threshold range. In practice, such gains may include one or more of proportional gains, derivative gains, integral gains, and other gains that aid in smooth and accurate control of the trajectory despite changing dynamics caused by the presence and movement of the load.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A work vehicle, comprising:
a movable implement configured to move relative to a frame of the work vehicle to move a load;
a plurality of driven wheels or tracks, wherein the driven wheels or tracks are controllable only in rotational speed and rotational direction to steer the work vehicle;
a plurality of sensors configured to output sensor data indicative of one or more properties of the work vehicle; and
a controller comprising a memory and a processor, wherein the controller is configured to receive the sensor data, to determine at least one characteristic of the load based on the sensor data, to determine a position of a center of gravity of the work vehicle along an x-axis of the work vehicle based on the at least one characteristic of the load, to determine a predicted motion of the work vehicle based on the position of the center of gravity along the x-axis and a slip factor, and to control the rotational speed, the rotational direction, or a combination thereof, of the driven wheels or tracks based on the predicted motion of the work vehicle such that a desired pathway of the work vehicle is substantially maintained.

2. The work vehicle of claim 1, wherein the at least one characteristic of the load comprises a position of the load, a weight of the load, or a combination thereof.

3. The work vehicle of claim 1, wherein the plurality of sensors comprise a load cell, a speed sensor, an accelerometer, a wind sensor, a vibration sensor, a noise or acoustic sensor, a force or resistance sensor, a load level sensor, a load tilt or angle sensor, a load weight sensor, a location stability sensor, a GPS sensor, or any combination thereof.

4. The work vehicle of claim 1, comprising a user interface communicatively coupled to the controller.

5. The work vehicle of claim 1, wherein the sensor data comprises a steering angle, a pitch angle, a roll angle, a yaw angle, or any combination thereof.

6. A method for controlling a work vehicle, comprising:
translating, via a controller having a memory and a processor, a moveable implement of the work vehicle relative to a frame of the work vehicle to move a load;
receiving, via the controller, sensor data indicative of one or more properties of the work vehicle;
determining, via the controller, at least one characteristic of the load based on the sensor data;
determining, via the controller, a position of a center of gravity of the work vehicle along an x-axis of the work vehicle based on the at least one characteristic of the load;
determining, via the controller, a predicted motion of the work vehicle based on the position of the center of gravity along the x-axis and a slip factor; and
controlling, via the controller, a rotational speed, a rotational direction, or a combination thereof, of the driven wheels or tracks based on the predicted motion of the work vehicle such that a desired pathway of the work vehicle is substantially maintained;
wherein only the rotational speed and the rotational direction of the driven wheels or tracks are controllable.

7. The method of claim 6, wherein the driven wheels or tracks are controlled to reduce an error between the desired pathway and a determined pathway determined by the controller.

8. The method of claim 7, comprising determining, via the controller, the determined pathway based upon at least one of a steering angle, a pitch angle, a roll angle, and a yaw angle.

9. The method of claim 6, wherein the position of the center of gravity is determined in three-dimensional space.

10. The method of claim 6, wherein the at least one characteristic of the load comprises a position of the load, a weight of the load, or a combination thereof.

* * * * *